Oct. 6, 1942.                R. F. SHOUP                 2,298,070
                          VOTING MACHINE
                     Original Filed Jan. 12, 1939
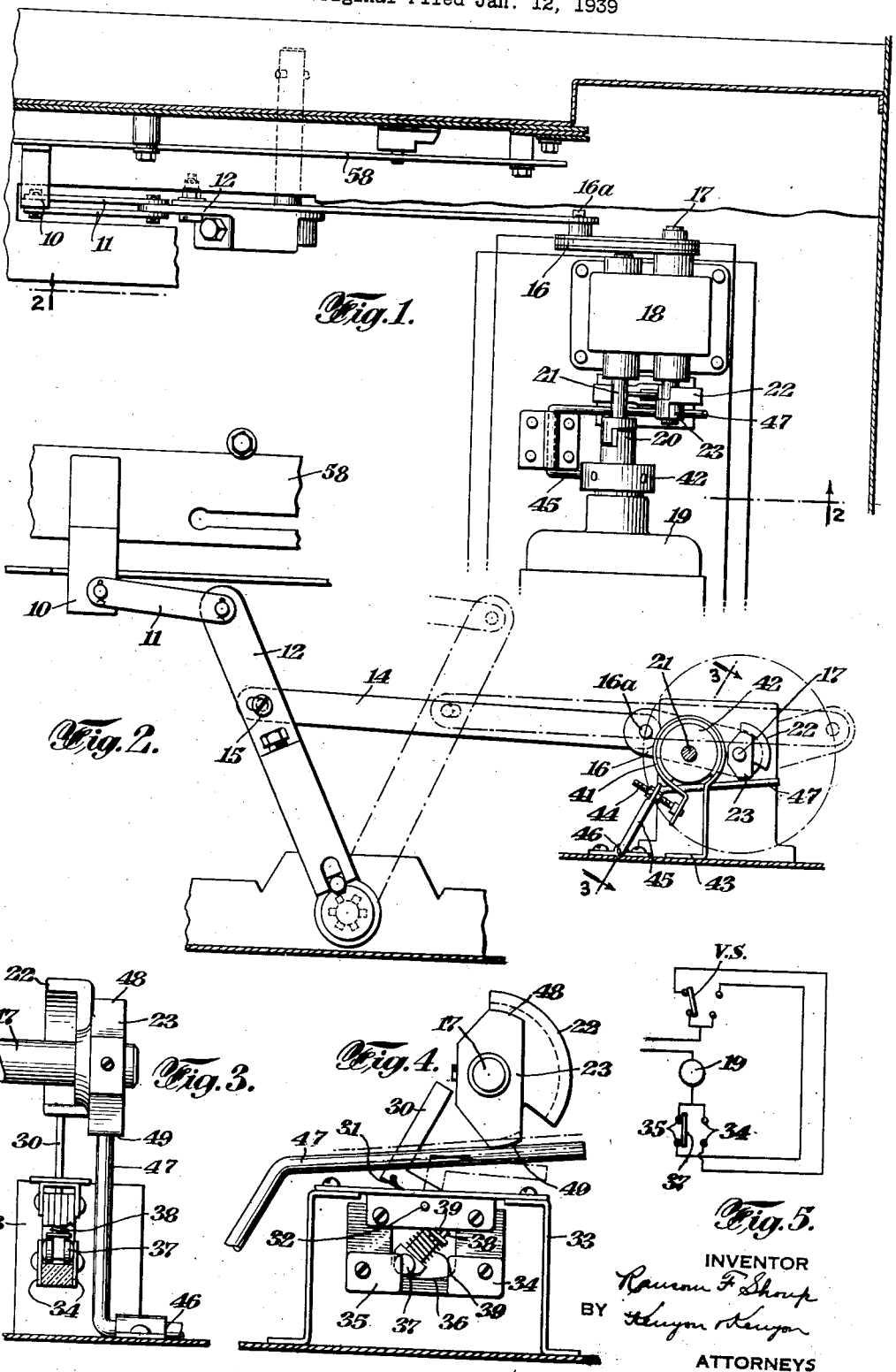
INVENTOR
Ransom F. Shoup
BY Kenyon & Kenyon
ATTORNEYS Patented Oct. 6, 1942

2,298,070

UNITED STATES PATENT OFFICE 2,298,070

VOTING MACHINE

Ransom F. Shoup, Ardmore, Pa., assignor to The Shoup Voting Machine Corporation, Philadelphia, Pa., a corporation of Delaware Original application January 12, 1939, Serial No. 250,478. Divided and this application April 10, 1941, Serial No. 387,833

11 Claims. (Cl. 192—142)

This invention relates to voting machines and more especially to mechanism for supplying power to open and close the curtains and operate the other portions of the machine in conjunction with the curtain operation. The invention is primarily applicable to voting machines of the type disclosed in Shoup et al. Patent No. 2,054,102 in which there is disclosed electrically energized mechanism for effecting to and fro movement of the main cam bar of the Shoup type voting machine between curtain open and curtain closed position and this application is a division of the application of Ransom F. Shoup, Serial No. 250,478, now Patent No. 2,281,603.

An object of this invention is to equip the electrical drive mechanism above referred to with improved switch means for interrupting the supply of electrical energy at a predetermined point in each stroke of the main cam bar and with brake means for bringing the drive mechanism to a stop with the main cam bar in curtain closed and curtain open position.

Other objects, novel features and advantages of this invention will become apparent from the following specification and accompanying drawing, wherein:

Fig. 1 is a fragmentary horizontal section through a voting machine embodying the invention, only so much of the voting machine being shown as is necessary to a complete understanding of the invention;

Fig. 2 is a section substantially on the line 2—2 of Fig. 1;

Fig. 3 is a section partly broken away substantially on the line 3—3 of Fig. 2;

Fig. 4 is a side elevation of Fig. 3, and

Fig. 5 is a wiring diagram.

In Figs. 1 and 2, 58 designates the main cam bar of the voting machine which is supported for horizontal reciprocation and movement of which in one direction effects closing of the curtains and release of the spindles from locked to unlocked condition and conditions the counters while movement thereof in the reverse direction moves the curtains to open position, registers the vote and returns the counters and spindles to inoperative locked positions. This cam bar is the same as the main cam bar of Shoup et al. No. 2,054,102, except that it is now located near the bottom of the cabinet rather than near the top as formerly.

The bar 58 is provided with an arm 10 which is attached by means of a link to the end of an arm 12 carried by a shaft 13 journalled near the bottom of the machine cabinet. A link 14 is provided at its left end with a slot into which fits a pin 15 carried by the arm 12. The right end of the link 14 is connected to the crank pin 16a of a crank arm 16 mounted on one end of the shaft 17 of a gear reduction mechanism 18. A motor 19 is connected through the coupling 20 with the input shaft 21 of the reduction gearing 18. The remaining end of the output shaft 17 is equipped with two cams 22 and 23. The cam 22 operates a switch, later to be described, and the cam 23 operates a brake mechanism also later to be described.

The cam 22 constitutes an arc of a circle of less than 180° and is arranged to engage and swing a lever 30 from the position shown in full lines in Fig. 4 to the position shown in broken lines in the same figure and then release the lever 30 to permit it to swing back into full line position under the influence of the spring 31. The lever 30 is L-shaped and one leg is supported by the pivot pin 32 to permit swinging movement of the lever. The pivot pin 32 is supported by a frame 33 from which are suspended a first pair of spaced and insulated contacts 34 and a second pair of spaced and insulated contacts 35, each pair being in circuit with one pair of contacts of a double throw voter-operated switch VS, the motor 19 and a source of electrical energy (Fig. 5). An electrically insulated arcuate guideway 36 extends from the space between one pair of contacts to the space between the other pair of contacts and a roller-equipped circuit-completing member 37 is provided for movement along the guide between two positions, in one of which it electrically connects the contacts 34 and in the other of which it electrically connects the contacts 35 as shown in Fig. 4. The member 37 is provided with a shank 38 slotted at its end to receive a pin 39 carried by the pivoted leg of the lever 30. A spring 40 surrounds the shank 38 and engages the pin 39. This arrangement assures a snap action of the member 37 when operated to open one circuit and close the other.

For example, assume counter-clockwise rotation of the cam 22 (Fig. 4) thereby engaging the front end of the cam with the upper leg of the lever 30 to cause rotation thereof into the broken line position. The pin 39 moves clockwise compressing the spring 40 and rotating the shank 38 counter-clockwise until there is alinement between the pivot 32, pin 39 and rollers of the circuit-completing member 37. Movement beyond such position results in the circuit-completing member 37, under the influence of the spring 40, rolling from the position shown in Fig. 4 along the guideway 36 to its opposite position in which it bridges the contacts 34. This action is substantially instantaneous due to the pressure applied to the member 37 by the spring 40. Further counter-clockwise rotation of the cam 22 disengages it from the upper leg of lever 30, permitting it to return to full line position under the influence of spring 31 and reverse operation of the circuit-closing member 37 is effected.

In Fig. 4 is shown in full lines the arrangement of the switch and its operating parts when the curtains are closed and the machine is conditioned for voting. At such time, the voter-operated switch VS is in the position shown in Fig. 5 with the bridging member 37 engaging the contacts 35 as shown and the motor circuit is open. After a voter has finished actuating the spindles, he operates the switch VS to move the bridging member into the position opposite to that shown in Fig. 5, thereby closing the motor circuit and causing operation of the motor. Counterclockwise rotation is effected of the cam 22 by the motor, thus causing actuation of the lever 30 by the cam to dotted line position as previously described with the resulting movement of the bridging member 37 from the position shown in Fig. 4 to its opposite position, thereby open-circuiting the motor and causing it to stop with the curtains in open position, the stopping of the motor at the proper point being assured through the operation of brake mechanism subsequently to be described. With the lever held in dotted line position by the cam 22, the voting machine is then ready for the exit of the voter and the entrance of the next voter. Upon the entry of the next voter, the voter operates the switch VS to return its bridging member to the position shown in Fig. 5, thereby closing the motor circuit and causing movement of the main cam bar into curtain-closed position with consequent return release of the lever 30 which is returned to full line position by the spring 31 to effect restoration of the bridging member 37 to the position shown in full lines in Fig. 4.

A brake band 41 partially surrounds a brake drum 42 on the motor drive shaft. One end of the brake band is substantially straight and is attached to the bottom of the voting machine at 43. The other end of the brake band is attached through an adjusting screw 44 to the arm 45 of a lever pivotally supported at 46. The remaining arm 47 of the lever extends beneath the cam 23 and is adapted to be engaged by the dwell surfaces 48 and 49, each of which constitutes a short arc of a circle concentric with the axis of the shaft 17 and both lying within a span of 180°. The diameter of the surface 49 is slightly greater than the diameter of the surface 48 for a purpose which will later become apparent. Upon engagement of either the surface 48 or the surface 49 with the arm 47, the brake band 41 is clamped against the brake drum 42 for the purpose of bringing the shaft 17 to rest.

When the curtains are in open position, the crank arm 16, the link 14 and the arm 12 are arranged as shown in broken lines in Fig. 2, while the cams 22 and 23 are correspondingly oriented from the position shown in Fig. 4, the brake 41 being applied through the medium of contact of surface 48 with the arm 47 and the circuit-completing member 37 being in the position opposite to that shown in Fig. 4 and the arm 30 being held in the broken line position of Fig. 4 by the cam 22. Upon operation by the voter of the switch VS, the motor-energizing circuit is closed through the contacts 34 and the circuit-closing member 37, thereby causing counter-clockwise rotation of the shaft 17. The surface 48 moves out of engagement with the arm 47, thus releasing the brake and the shaft 17 causes counter-clockwise rotation of the arm 16 from the position shown in dotted lines in Fig. 2 to the position shown in full lines in Fig. 2, thus causing movement of the arm 12 from the broken line position of Fig. 2 to the full line position of the same figure with consequent movement of the main cam bar 58 into the position shown in Fig. 2. As the cam 22 rotates, it releases the lever 30 which, under the influence of the spring 31 moves to the full line position of Fig. 4 and causes movement of the circuit-completing member 37 into the position shown in Fig. 4 to deenergize the motor. Further rotation of the shaft brings the surface 49 into contact with the arm 47 again to apply the brake. The arrangement of the cam 22, lever 30 and circuit-closing member 37 and the arrangement of the surface 48 is such that the crank arm 16 is brought to rest with the crank pin 16a above dead center, that is, above the line connecting the axis of the pin 15 and the axis of the shaft 17.

As previously mentioned, with the cam bar 58 in the position shown in Fig. 2, the machine is conditioned for voting and after the voter has completed actuation of the voting spindles or handles, he again operates the switch VS to close the motor-energizing circuit through the contacts 35 and the circuit-completing member 37, resulting in further counter-clockwise rotation of the shaft 17 with consequent disengagement of the surface 49 from the lever 47 to release the brake. After a predetermined amount of movement, the cam 22 engages the lever 30 to swing it from the full line position of Fig. 10 to the broken line position of the same figure, thereby moving the member 37 to open circuit the motor and electrically connect the contacts 34. The surface 48 again engages the arm 47 to apply the brake and again the arrangement of the cam 22 and the surface 49 is such that the arm 16 comes to rest with the crank pin 15 above dead center. The purpose of having the shaft 17 come to rest with the crank pin 15 above dead center is to facilitate the conversion of the machine from electrical operation to manual operation as fully set forth in Shoup Patent 2,281,663.

I claim:

1. In a voting machine, a driven shaft, an electric motor for driving said shaft, a pair of motor energizing circuits each containing a pair of spaced contacts, a guide extending between said pairs of contacts, a single circuit-completing member capable of solely bridging either pair of contacts, said member being movable along said guideway from bridging relation with either pair of contacts out of bridging relation to said contacts and into bridging relation to the remaining pair of contacts, and means actuated by said driven shaft for effecting movement of said member along said guide.

2. In a voting machine, a driven shaft, an electric motor for driving said shaft, a pair of motor energizing circuits each containing a pair of spaced contacts, a guide extending between said pairs of contacts, a single rollable circuit completing member capable of solely bridging either pair of contacts, said member being movable along said guide from bridging relation with either pair of contacts out of bridging relation to said contacts and into bridging relation to the remaining pair of contacts and having a slotted shank, a pivoted arm having a pin arranged in the shank slot, a spring carried by said shank and engaging said pin, and means controlled by said driven shaft for effecting oscillation of said arm.

3. In a voting machine, a driven shaft, an electric motor for driving said shaft, a pair of motor energizing circuits each containing a pair of spaced contacts, a guide extending between said pairs of contacts, a single rollable circuit-completing member capable of solely bridging either pair of contacts, said member being movable along said guide from bridging relation with either pair of contacts out of bridging relation to said contacts and into bridging relation to the remaining pair of contacts and having a slotted shank, a pivoted lever having a pin arranged in the shank slot, a spring carried by said shank and engaging said pin, resilient means tending to maintain said lever in one position, and means actuated by said driven shaft for engaging said arm to move it out of said position and release it for return to said position.

4. In a voting machine, a driven shaft, an electric motor having a shaft, reduction gearing connecting said motor and driven shafts, switch means for controlling operation of the motor, brake mechanism associated with said motor shaft including a lever for supplying power to actuate said brake mechanism, and a rotatable member operated by said driven shaft, said member having arcuate surfaces engageable with said lever to effect movement thereof to apply power to the brake mechanism.

5. In a voting machine, a driven shaft, an electric motor having a shaft, reduction gearing connecting said motor and driven shafts, switch means for controlling operation of the motor, brake mechanism associated with said motor shaft including a lever for supplying power to actuate said brake mechanism, and a rotatable member operated by said driven shaft, said member having two different diameter arcuate surfaces engageable with said lever to effect movement thereof to apply power to the brake mechanism.

6. In a voting machine, a driven shaft, an electric motor having a shaft, reduction gearing connecting said motor and driven shafts, switch means for controlling operation of the motor, brake mechanism associated with said motor shaft including a lever for supplying power to actuate said brake mechanism, and a rotatable member operated by said driven shaft, said member having two arcuate surfaces comprehended within a semi-circle for engaging said lever to effect movement thereof to apply power to the brake mechanism.

7. In a voting machine, a driven shaft, an electric motor having a shaft, reduction gearing connecting said motor and driven shafts, switch means for controlling operation of the motor, brake mechanism associated with said motor shaft including a lever for supplying power to actuate said brake mechanism, and a rotatable member operated by said driven shaft, said member having two different diameter arcuate surfaces comprehended within a semi-circle for engaging said lever to effect movement thereof to apply power to the brake mechanism.

8. In a voting machine, an operating bar movable to and fro, mechanism including a motor for actuating said bar, motor-control switching means actuated by said bar actuating mechanism to de-energize said motor at a predetermined point in each operating bar stroke, brake means for said motor, and means operated by said bar actuating mechanism for applying said brake means upon de-energization of said motor.

9. In a voting machine, an operating bar movable to and fro, mechanism including a motor for actuating said bar, a pair of motor energizing circuits each containing a pair of spaced contacts, a guide extending between said pairs of contacts, a circuit-completing member movable along said guide into and out of bridging relation to each pair of contacts, means actuated at a predetermined point in each operating bar stroke to effect movement of said circuit-completing member out of bridging relation to one pair of contacts and into bridging relation to the other pair of contacts, brake mechanism for said motor, and means operated by said bar actuating mechanism for applying said brake means upon de-energization of said motor.

10. In a voting machine, an operating bar movable to and fro, a driven shaft, connections between said driven shaft and said operating bar for effecting movement of the latter upon rotation of the former, an electric motor having a shaft, reduction gearing connecting said motor shaft and said driven shaft, a pair of motor energizing circuits each containing a pair of spaced contacts, a circuit-completing member movable along said guide into and out of bridging relation to each pair of contacts, actuating means for said circuit-completing member, a first member carried by said driven shaft for engaging said actuating means to effect movement of said circuit-completing member, brake means for said motor, and a second member carried by said driven shaft for actuating said brake means.

11. In a voting machine, an operating bar movable to and fro, a driven shaft, connections between said driven shaft and said operating bar for effecting movement of the latter upon rotation of the former, an electric motor having a shaft, reduction gearing connecting said motor shaft and said driven shaft, a pair of motor energizing circuits each containing a pair of spaced contacts, a circuit-completing member movable along said guide into and out of bridging relation to each pair of contacts, actuating means for said circuit-completing member, a pivoted arm connected to said circuit-completing member for effecting movement of the latter by the former, a spring tending to maintain said lever in one position, a segmental member carried by said driven shaft for engagement with said lever to move it out of said position and subsequently release it for return to said position, brake means for said motor including a pivoted lever, and segmental actuators for said last-named lever carried by said drive shaft.

RANSOM F. SHOUP.